United States Patent [19]

Kan et al.

[11] 4,151,334

[45] Apr. 24, 1979

[54] PROCESS FOR THE PREPARATION OF CARBODIIMIDE-ISOCYANURATE FOAMS EMPLOYING QUATERNARY BORON SALTS AS CATALYSTS

[75] Inventors: Peter T. Kan, Plymouth; Moses Cenker, Trenton, both of Mich.

[73] Assignee: BASF Wyandotte Corporation, Wyandotte, Mich.

[21] Appl. No.: 833,794

[22] Filed: Sep. 16, 1977

Related U.S. Application Data

[63] Continuation-in-part of Ser. No. 752,461, Dec. 20, 1976, abandoned.

[51] Int. Cl.² ............................................. C08G 18/14
[52] U.S. Cl. .................................... 521/105; 521/901; 521/902

[58] Field of Search .................... 260/2.5 BF, 2.5 AB, 260/2.5 AC, 2.5 AW; 521/105, 901, 902

[56] References Cited

U.S. PATENT DOCUMENTS

| | | | |
|---|---|---|---|
| 3,635,848 | 1/1972 | Rambosek | 260/2.5 AW |
| 3,697,485 | 10/1972 | Rambosek | 260/2.5 AW |
| 3,853,818 | 12/1974 | Bechara | 260/2.5 AC |
| 3,880,782 | 4/1975 | Rambosek | 260/2.5 AW |

*Primary Examiner*—M. J. Welsh
*Attorney, Agent, or Firm*—Joseph D. Michaels; Bernhard R. Swick; Robert E. Dunn

[57] ABSTRACT

Rigid foams characterized by carbodiimide and isocyanurate linkages are prepared by catalytically condensing an organic polyisocyanate in the presence of certain quaternary boron salts.

14 Claims, No Drawings

PROCESS FOR THE PREPARATION OF CARBODIIMIDE-ISOCYANURATE FOAMS EMPLOYING QUATERNARY BORON SALTS AS CATALYSTS

CROSS-REFERENCE TO RELATED U.S. APPLICATION

The subject application is a continuation-in-part of U.S. patent application Ser. No. 752,461 filed Dec. 20, 1976 and now abandoned.

BACKGROUND OF THE INVENTION

1. Field of the Invention

The present invention relates to a process for the preparation of foams characterized by carbodiimide and isocyanurate linkages. More particularly, the invention relates to the preparation of foams characterized by carbodiimide and isocyanurate linkages employing certain quaternary boron salts as catalysts for both the carbodiimide and isocyanurate reactions.

2. Prior Art

The preparation of rigid foams characterized by carbodiimide and isocyanurate linkages is well known in the art as evidenced by inter alia U.S. Pat. Nos. 3,645,923; 3,657,161; 3,717,596; 3,723,366; and 3,746,709. Generally, these foams are prepared by catalytically condensing an organic polyisocyanate (a) in the presence of a compound which promotes the carbodiimide reaction and a compound which promotes trimerization reaction or (b) in the presence of a compound which promotes both reactions.

U.S. Pat. No. 3,635,848 teaches the use of a coordination compound of an organic borate ester and an alkali or alkaline earth metal as a trimerization catalyst for organic polyisocyanates. There is no teaching of the use of the compounds of this patent as catalysts for the preparation of foams characterized by carbodiimide and isocyanurate linkages.

U.S. Pat. No. 3,697,485 teaches the use of a catalyst system comprising an organic orthoborate and an alcoholate or phenolate salt as a trimerization catalyst for organic polyisocyanates. There is no teaching of the use of the catalysts with carbodiimide-promoting compounds or that the catalysts promote the carbodiimide reaction. In fact, since the systems of this patent are primarily useful in the preparation of molded resins, the formation of carbodiimide groups, which would necessitate the generation of carbon dioxide, would be very undesirable for such an application.

SUMMARY OF THE INVENTION

The present invention relates to the preparation of foams characterized by carbodiimide and isocyanurate linkages employing as catalysts for the carbodiimide and isocyanurate reactions certain quaternary boron salts.

DESCRIPTION OF THE PREFERRED EMBODIMENTS

As mentioned above, the present invention relates to the preparation of foams characterized by carbodiimide and isocyanurate linkages by catalytically condensing an organic polyisocyanate in the presence of certain quaternary boron salts. The quaternary boron salts of use in the subject invention are prepared by the reaction of boric acid or alkyl esters thereof with (1) an organic compound having a reactive hydrogen atom and a nitrogen atom selected from the group consisting of primary and secondary alkyl amines having from 1-4 carbon atoms in alkyl chain, alkylenediamines, polyalkylene polyamines and alkanolamines having from 2 to 4 carbon atoms in alkanol chain or mixtures thereof with an alcohol or phenol, and (2) an alkali metal or alkali metal compound. The reaction is generally carried out at a temperature of from 25° C. to 200° C. for a period of from one half hour to 24 hours optionally in the presence of water or an organic solvent. Representative organic compound which may be used include primary and secondary $C_1$-$C_4$ alkyl, and dialkyl amines such as methylamine, dimethylamine, ethylamine, diethylamine, propylamine, dipropylamine, butylamine, dibutylamine, methylethylamine; alkylenediamines and polyalkylenepolyamines such as ethylenediamine, propylenediamine, diethylenetriamine, triethylenetetraamine, and dipropylenetriamine; alkanolamines have from 2 to 4 carbon atoms in the alkanol chain such as ethanolamine, diethanolamine, N-methylethanolamine, propanolamine, dipropanolamine, and t-butanolamine. Representative alcohols which may be used have from 1 to 6 carbon atoms and from 1 to 3 hydroxyl groups such as methanol, ethanol, propanol, isopropanol, n-butanol, t-butanol, n-hexanol, cyclohexanol, ethylene glycol, 1,2-propylene glycol, 1,3-propylene glycol, glycerine, 1,1,1-trimethylolpropane, and 1,2,3-trimethylolpropane. Representative phenols which may be used have from 6 to 20 carbon atoms and from 1 to 3 hydroxyl groups such as phenol, cresol, $C_1$-$C_4$ alkylsubstituted cresols, catechol, $C_1$-$C_4$ alkylsubstituted catechols, naphthol and $C_1$-$C_4$ alkylsubstituted naphthols. Generally, from two to four moles of the organic compound is reacted with one mole of boric acid or the alkyl ester thereof.

As mentioned above, an alkyl ester of boric acid may be employed in lieu of boric acid. Alkyl borates having from 1 to 4 carbon atoms in the alkyl chain are preferred reactants. Representative alkali metals or alkali metal compounds include sodium, potassium and lithium, and hydroxides and oxides thereof. Generally, one mole or atom of alkali metal or alkali metal compound is employed per mole of quaternary boron salt. In the preparation of the foams in accordance with the subject invention, from 0.1 to 10 percent by weight of quaternary boron salts based on the weight of the organic polyisocyanate will generally be employed.

In addition to the quaternary boron salt, auxiliary carbodiimide-promoting compounds and trimerization catalysts may be employed in the process of the subject invention. Representative compounds which promote the carbodiimide reaction include aliphatic alcohols such as methyl alcohol and furfuryl alcohol; amino alcohols having a molecular weight of from 89 to 304 such as N,N-dialkylaminoalkanols, triethanolamine, N-2-hydroxyethylmorpholine and N,N,N',N'-tetrakis(2-hydroxypropyl)ethylene diamine and s-triazine compounds such as 2,4,6-tris(diethanolamino)-s-triazine, 2,4,6-tris(N-methylethanolamino)-s-triazine, and unsymmetrically substituted triazines of the formula:

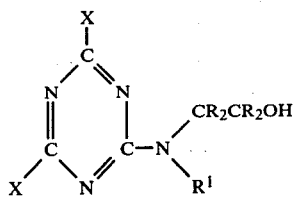

wherein R is hydrogen or lower alkyl of from 1 to 10 carbon atoms, $R^1$ is $CR_2CR_2OH$ or lower alkyl of from 1 to 12 carbon atoms, X is $NR_2$, alkoxy of from 1 to 12 carbon atoms, phenoxy, alkyl of from 1 to 12 carbon atoms, phenyl, hydroxyl, halogen, aziridyl, pyrrolidyl, piperidyl, or N-alkylpiperazyl. Since the triazines are unsymmetrically substituted, it is apparent that each X cannot concurrently be

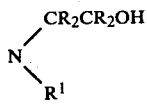

wherein each R and $R^1$ is the same. Generally from about 0% to 10% by weight of auxiliary carbodiimide-promoting compound based on the weight of organic polyisocyanate will be employed in the subject invention.

Representative trimerization catalysts are well known in the art. Examples of these catalysts are: (a) organic strong bases, (b) tertiary amine cocatalyst combinations, (c) Friedel-Crafts catalysts, (d) basic salts of carboxylic acids, (e) alkali metal oxides, alkali metal alcoholates, alkali metal phenolates, alkali metal hydroxides and alkali metal carbonates, (f) onium compounds from nitrogen, phosphorus, arsenic, antimony, sulfur and selenium and (g) monosubstituted monocarbamic esters. Generally from about 0% to 10% by weight of auxiliary trimerization catalyst will be employed in the subject invention.

The organic polyisocyanate used in the preparation of the foams in the process of the subject invention corresponds to the formula:

$$R''(NCO)_z$$

wherein R" is a polyvalent organic radical which is either aliphatic, aralkyl, alkaryl, aromatic or mixtures thereof, and z is an integer which corresponds to the valence of R" and is at least two. Representative of the organic polyisocyanates contemplated herein includes, for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4"-triphenylmethane triisocyanate, 2,4,6-toluene triisocyanates; the aromatic tetraisocyanates such as 4,4'-dimethyldiphenylmethane-2,2'-5,5-tetraisocyanate, and the like; arylalkyl polyisocyanates, such as xylylene diisocyanate; aliphatic polyisocyanates, such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenyl-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate.

These polyisocyanates are prepared by conventional methods known in the art such as the phosgenation of the corresponding organic amine.

Still another class of organic polyisocyanates contemplated for use herein are the so-called "quasiprepolymers". These quasi-prepolymers are prepared by reacting an excess of organic polyisocyanate or mixtures thereof with a minor amount of an active hydrogen-containing compound as determined by the well-known Zerewitinoff test, as described by Kohler in Journal Of The American Chemical Society, 49, 3181 (1927). These compounds and their methods of preparation are well known in the art. The use of any one specific active hydrogen compound is not critical hereto, rather any such compound can be employed herein.

Suitable active hydrogen-containing groups as determined by the Zerewitinoff method which are reactive with an isocyanate group include —OH, —NH—, —COOH, and —SH. Examples of suitable types of organic compounds containing at least two active hydrogen-containing groups which are reactive with an isocyanate group are hydroxyl-terminated polyesters, polyalkylene ether polyols, hydroxyl-terminated polyurethane polymers, polyhydric polythioethers, alkylene oxide adducts of phosphorus-containing acids, polyacetals, aliphatic polyols, aliphatic thiols including alkane, alkene and alkyne thiols having two or more —SH groups; diamines including both aromatic aliphatic and heterocyclic diamines, as well as mixtures thereof. Compounds which contain two or more different groups within the above-defined classes may also be used in accordance with the process of the present invention such as, for example, amino alcohols which contain an amino group and a hydroxyl group. Also, compounds may be used which contain one —SH group and one —OH group as well as those which contain an amino group and a —SH group.

Any suitable hydroxy-terminated polyester may be used such as are obtained, for example, from polycarboxylic acids and polyhydric alcohols. Any suitable polycarboxylic acid may be used such as oxalic acid, malonic acid, succinic acid, glutaric acid, adipic accid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethyl-succinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, 1,3-propylene glycol, 1,2-propylene glycol, 1,4-butanediol, 1,3-butanediol, 1,2-butylene glycol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxy-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxy-terminated polyester with only a portion of the components being a diamine such as ethylenediamine.

Any suitable polyalkylene ether polyol may be used such as the polymerization product of an alkylene oxide or of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and *Encyclopedia Of Chemical Technology*, Vol. 7, pp. 257–262, published by Interscience Publishers, Inc. (1951) or in U.S. Pat. No. 1,922,459. Alkylene oxide adducts of Mannich condensation products are also useful in the invention.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred.

Any suitable hydroxy-terminated polyacetal may be used such as, for example, the reaction product of formaldehyde or other suitable aldehyde with a dihydric alcohol or an alkylene oxide such asthose disclosed above.

Any suitable aliphatic thiol including alkane thiols containing at least two —SH groups may be used such as 1,2-ethanedithiol, 1,2-propanedithiol, 1,3-propanedithiol, and 1,6-hexanedithiol; alkanethiols such as 2-butene-1,4-dithiol, and alkynethiols such as 3-hexyne-1,6-dithiol.

Any suitable polyamine may be used including aromatic polyamines such as methylene dianiline, polyarylpolyalkylene polyamine (crude methylene dianiline), p-aminoaniline, 1,5-diaminonaphthalene, and 2,4-diaminotoluene; aliphatic polyamines such as ethylenediamine, 1,3-butylenediamine, as well as substituted secondary derivatives thereof.

In addition to the above hydroxyl-containing compounds, other compounds which may be employed include graft polyols. These polyols are prepared by the in situ polymerization product of a vinyl monomer in a reactive polyol medium and in the presence of a free radical initiator. The reaction is generally carried out at a temperature ranging from about 40° C. to 150° C.

The reactive polyol medium generally has a molecular weight of at least about 500 and a hydroxyl number ranging from about 30 to about 600. The graft polyol has a molecular weight of at least about 1500 and a viscosity of less than 40,000 cps. at 10% polymer concentration.

A more comprehensive discussion of the graft polyols and their method of preparation can be found in U.S. Pat. Nos. 3,383,351; 3,304,273; 3,652,639, and 3,823,201, the disclosures of which are hereby incorporated by reference.

Also, polyols containings ester groups can be employed in the subject invention. These polyols are prepared by the reaction of an alkylene oxide with an organic dicarboxylic acid anhydride and a compound containing a reactive hydrogen atom. A more comprehensive discussion of these polyols and their method of preparation can be found in U.S. Pat. Nos. 3,585,185; 3,639,541; and 3,639,542. As is clear from the above, the particular polyol ingredient employed in the preparation of the quasi-prepolymer is not a critical aspect of the present invention. Any compound containing at least two reactive hydrogen atoms may be so used. Particularly preferred compounds are those having an equivalent weight between 100 and 1500.

If desired, the process of the subject invention can be carried out by condensing an organic polyisocyanate in the presence of a polyol. Any of the organic compounds containing at least two active hydrogen-containing groups reactive with an isocyanate group described above in connection with the preparation of the "quasi-prepolymers" may be employed in the subject invention. Generally, the amount of polyol employed will be from 5% to 70% by weight, preferably from 5% to 20% by weight, based on the weight of the organic polyisocyanate. If a polyol is employed in the process of the subject invention it is preferred to also employ a urethane catalyst.

Urethane catalysts which may be employed in the present invention are well known in the art and include the metal or organometallic salts of carboxylic acid and tertiary amines. Representative of such compounds are: dibutyltin dilaurate, dibutyltin diacetate, stannous octoate, lead octoate, cobalt naphthenate, and other metal or organometallic salts of carboxylic acids in which the metal is bismuth, titanium, iron, antimony, uranium, cadmium, aluminum, mercury, zinc, or nickel as well as other organometallic compounds such as are disclosed in U.S. Pat. No. 2,846,408. Tertiary amines such as triethylenediamine, triethylamine, diethylcyclohexylamine, dimethylethanolamine, methylmorpholine, trimethylpiperazine, N-ethylmorpholine and diethylethanolamine may also be employed as well as mixtures of any of the above. The preferred urethane-promoting catalyst is dibutyltin diacetate. Generally, the amount of the urethane-promoting catalyst employed will be from 0.01% to 10% by weight based on the weight of organic polyisocyanate.

The foams of the present invention are prepared by mixing together the organic polyisocyanate, optionally a polyol, and the catalysts at an initiating temperature which, depending on the catalyst, will range from about 0° C. to 50° C. Under such conditions almost immediately an exotherm is developed within the reaction system, carbon dioxide is generated and foam formation begins. Alternatively, the foams may be prepared by adding the polyols and the catalysts to the mixture of polyisocyanate and an auxiliary blowing agent, preferably a halohydrocarbon.

The present invention also contemplates the incorporation of additional ingredients in the foam formulation to tailor the properties thereof. Thus, plasticizers, surfactants, such as the silicone surfactants, e.g. alkylpolysiloxanes, may be employed in the invention. Further additional ingredients include auxiliary or supplemental blowing agents, such as water or halohydrocarbons. Also, inorganic fillers, pigments, and the like can be used.

In any event, the foams prepared in accordance herewith are rigid cellular products having a density of from about one pound to forty pounds per cubic foot which exhibit excellent strength and flame properties, such as fire resistance, low smoke evolution, and excellent weight retention.

Following are specific, non-limiting examples which are provided to illustrate the enumerated principles described herein. All parts are by weight unless otherwise indicated. In the examples which follow, the following abbreviations are employed:

TDI—a mixture of 80/20 by weight 2,4-, 2,6-tolylene diisocyanate
PAPI—polymethylene polyphenyl isocyanate
TDH—1,3,5-tris(N,N-dimethylaminopropyl) hexahydrotriazine
DBTDA—dibutyltin diacetate
DMT—2,4-bis(diethylamino)-6-N-methylethanolamino-s-triazine
FA—furfuryl alcohol
TEA—triethanolamine
DC-193—polyalkyl siloxane-polyoxyalkylene copolymer, a foam stabilizer
Polyol I—a polyol prepared by the reaction of ethylene oxide with trimethylolpropane, said polyol having an equivalent weight of 250
CEF—tris(chloroethyl)phosphate
DMF—dimethylformamide
DPG—dipropylene glycol

EXAMPLE I

Preparation Of Quaternary Boron Salts

Compound A

A reaction vessel equipped with stirrer, thermometer, condenser, inlet means and heat exchange means was charged with 337.5 parts (4.5 moles) of N-methylethanolamine and 46.4 parts (0.75 mole) of boric acid. The charge was heated to 80° C. in about three hours under 15 mm. of vacuum with the removal of 40.5 parts of water. To the resulting solution with some cooling 18 parts (0.75 atom) of metallic sodium was added in small portions over a period of ninety minutes maintaining the reaction temperature between 80° C.–90° C. Thereafter, the reaction mixture was heated at 90° C. at less than 1 mm. of mercury to remove excess N-methylethanolamine.

Compound B

To a reaction vessel equipped as described above was charged 166 parts (1.0 mole) of 4-t-butylcatechol and a solution of 20 parts (0.5 mole) of sodium hydroxide in 100 parts of water. After stirring for ten minutes, 100 ml. of benzene was added to the vessel followed by a slurry of 30.9 parts (0.5 mole) of boric acid in 60 parts of water. An additional 300 ml. of benzene was added and the resulting suspension was refluxed at 66° C.–76° C. for 3.5 hours while a total of 193 parts of water was removed from the reaction mixture by distillation. Thereafter 400 ml. of xylene was added to the vessel while the benzene was distilled. The resulting suspension was refluxed at 114° C.–115° C. for 3.5 hours and the xylene was then stripped from the reaction mixture at 115° C. under less than 10 mm. of mercury. A yield of 177 parts of solid sodium bis(4-t-butylcatecholoxy)borate was obtained.

Compound C

To a reaction vessel equipped as described above was charged 300 parts (40 moles) of N-methylethanolamine and 115 parts (0.5 moles) of tri-n-butylborate. The resulting clear mixture was heated at 140° C.–160° C. for about three hours while first butanol and then excess N-methylethanolamine was distilled from the reaction mixture. The remaining liquid was further distilled at 65° C. under less than 20 mm. of mercury to obtain 103 parts (89% of theory) of tris(2-N-methylaminoethyl)borate. The product was further purified by redistillation at 74° C./1.2 mm. of mercury yielding a product having a refractive index of 1.4697 at 25° C.

To a solution of 10 parts (0.25 mole) of sodium hydroxide in 150 ml. of methanol was added over a period of 25 minutes a solution of 23.5 parts (0.25 mole) of phenol in 50 ml. of methanol. Thereafter, over a period of 30 minutes 58.2 parts (0.25 mole) of tris(2-N-methylaminoethyl)borate was added. The methanol was then distilled off at 56° C.–81° C. (pot temperature up to 150° C.). The resulting product, sodium phenoxy tris(2-methylaminoethyl)borate, was a cloudy yellowish liquid.

Compound D in TEA

To a reaction vessel equipped as described above was added a solution of 10 parts (0.25 mole) of sodium hydroxide in 150 ml. of methanol and 23.5 parts (0.25 mole) of phenol in 50 ml. of methanol. Over a period of 25 minutes, 39.3 parts (0.25 mole) of triethanolamine borate in 150 ml. of methanol was added to the reaction vessel. The resulting solution was distilled to remove the methanol. To the resulting viscous product was added 100 ml. of benzene and 100 parts of triethanolamine. The mixture was refluxed at 80° C. and 4.5 parts of water was azeotropically collected. The benzene was then stripped to yield 169 parts (100% of theory) of sodium phenyltriethanolamineborate in triethanolamine.

EXAMPLES II–XII

A series of foams was prepared employing the above-described quaternary boron salts as a co-catalyst in the preparations. In all cases, the foams were prepared by adding all ingredients together at room temperature. An immediate exothermic reaction occurred and foams resulted. Infrared spectroscopic evaluation showed the presence of carbodiimide and isocyanurate absorption bands. Details of the preparations are presented in Table I, below. The catalysts identified as A–D are those quaternary boron salts described in Example I.

TABLE I

| Example | Isocyanate parts | | Catalyst System | | Polyol, parts | DC-193, parts | Volume, qt. |
|---|---|---|---|---|---|---|---|
| | TDI | PAPI | parts | parts | | | |
| II | 100 | — | FA 1.5 | A 1.5 | — | 0.5 | 1.0 |
| III | 50 | 50 | FA 4.5 | A 4.5 | — | 0.5 | 0.2 |
| IV | 100 | — | DMT 1.5 | A 1.5 | — | 0.5 | 1.5 |
| V | 50 | 50 | DMT 4.5 | A 4.5 | — | 0.5 | 1.0 |

TABLE I-continued

| Example | Isocyanate parts TDI | Isocyanate parts PAPI | Catalyst System parts | Catalyst System parts | Polyol, parts | DC-193, parts | Volume, qt. |
|---|---|---|---|---|---|---|---|
| VI | 100 | — | FA 2.0 | B 2.0 | I 4.0 | — | 1.0 |
| VII | 100 | — | DMT 2.0 | B 2.0 | I 4.0 | — | 1.2 |
| VIII | 100 | — | DMT 3.0 | C 3.0 | — | 1.0 | 1.8 |
| IX | 100 | — | FA 3.0 | C 3.0 | — | 1.0 | 2.2 |
| X | 100 | — | TEA 0.6 | D 0.4 | — | — | 0.3 |
| XI | 100 | — | TEA 0.6 | D 0.4 | — | 1.0 | 1.0 |
| XII | 100 | — | TEA 1.8 | D 1.2 | — | 1.0 | 1.5 |

EXAMPLE XIII

A series of foams was prepared employing various quarternary boron salts as the sole catalyst. In each preparation, 100 parts of TDI and 1 part of silicone surfactant DC-193 was employed. Infrared spectroscopic analysis indicated strong carbodiimide and isocyanurate absorptions for all foams. The particular catalysts employed and amounts thereof are presented in Table II below.

TABLE II

| Catalyst, | Parts, | Other Components, parts | Foam Vol., qt. |
|---|---|---|---|
| Compound C | 1.0 | — | 1.0 |
| " | 2.0 | — | 1.5 |
| " | 3.0 | — | 1.5 |
| " | 3.0 | CEF, 2.0 | 1.7 |
| " | 2.0 | TDH, 1.0 | 1.6 |
| Compound D | 1.0 | DMF, 1.0 | 1.5 |
| " | 2.0 | DMF, 2.0 | 2.0 |
| " | 1.0 | CEF, 1.0 | 1.4 |
| " | 2.0 | CEF, 2.0 | 1.3 |
| " | 1.0 | DPG, 1.0 | 2.5 |

The embodiment of the invention in which an exclusive property or privilege is claimed are defined as follows:

1. A process for the preparation of foams characterized by carbodiimide and isocyanurate linkages comprising catalytically condensing an organic polyisocyanate in the presence of a catalytically sufficient amount of a quaternary boron salt prepared by the reaction at a temperature of from 25° C. to 200° C. for a period of one half hour to 24 hours of (a) boric acid or an alkyl ester thereof with (b) an organic compound having a reactive hydrogen atom on a nitrogen atom selected from the group consisting of primary and secondary alkyl amines having from 1 to 4 carbon atoms in the alkyl chain, alkylenediamines, polyalkylene polyamines and primary and secondary alkanolamines having from 2 to 4 carbon atoms in the alkanol chain or mixtures of the above organic compounds with an alcohol having from 1 to 6 carbon atoms and from 1 to 3 hydroxyl groups or a phenol having from 6 to 20 carbon atoms and from 1 to 3 hydroxyl groups, and (c) an alkali metal, alkali metal oxide or an alkali metal hydroxide employing a mole ratio of (a):(b):(c) of from 1:2:1 to 1:4:1.

2. The process of claim 1 wherein (b) is a primary or secondary alkanolamine having from 2 to 4 carbon atoms in the alkanol chain.

3. The process of claim 2 wherein the alkanolamine is N-methylethanolamine.

4. The process of claim 1 wherein (b) is a mixture of an alkanolamine and phenol.

5. The process of claim 1 wherein (a) is boric acid.

6. The process of claim 1 wherein (c) is sodium hydroxide.

7. The process of claim 1 wherein the organic polyisocyanate is selected from the group consisting of toluene diisocyanate, methylene diphenyl diisocyanate, polyphenyl polymethylene polyisocyanate and mixtures thereof.

8. The process of claim 1 wherein an auxiliary carbodiimide-promoting catalyst is employed.

9. The process of claim 8 wherein the auxiliary carbodiimide-promoting catalyst is 2,4-bis(diethylamino)-6-N-methylethanolamino-s-triazine or furfuryl alcohol.

10. The process of claim 1 carried out in the presence of from 5% to 70% by weight based on the weight of the organic polyisocyanate of a polyol having an average functionality of 2 to 8 and an average hydroxyl equivalent of from about 100 to 1500.

11. The process of claim 10 carried out in the presence of a catalyst which promotes urethane linkages.

12. The process of claim 11 wherein the catalyst which promotes urethane linkages is dibutyltin diacetate.

13. The process of claim 1 wherein an auxiliary trimerization catalyst is employed.

14. The process of claim 13 wherein the auxiliary trimerization catalyst is 1,3,5-tris(N,N-dimethylaminopropyl)-hexahydrotriazine.

* * * * *